US007076474B2

(12) United States Patent
Jin et al.

(10) Patent No.: US 7,076,474 B2
(45) Date of Patent: Jul. 11, 2006

(54) METHOD AND SYSTEM FOR SIMULATING A BUSINESS PROCESS USING HISTORICAL EXECUTION DATA

(75) Inventors: Li-Jie Jin, Mountain View, CA (US); Fabio Casati, Palo Alto, CA (US); Ming-Chien Shan, Saratoga, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 735 days.

(21) Appl. No.: 10/174,733

(22) Filed: Jun. 18, 2002

(65) Prior Publication Data

US 2003/0233273 A1    Dec. 18, 2003

(51) Int. Cl.
*G06F 17/00* (2006.01)
*G06N 5/02* (2006.01)
(52) U.S. Cl. .............................. 706/45; 706/12; 706/14
(58) Field of Classification Search .................. 706/45, 706/12, 14; 703/2; 700/104
See application file for complete search history.

(56) References Cited

U.S. PATENT DOCUMENTS

| 4,827,423 | A  | * | 5/1989  | Beasley et al. ............... 700/96 |
| 6,327,350 | B1 | * | 12/2001 | Spangler et al. ........ 379/115.01 |
| 6,744,436 | B1 | * | 6/2004  | Chirieleison et al. ....... 345/427 |
| 2002/0147630 | A1 | * | 10/2002 | Rose et al. .................... 705/10 |
| 2003/0036890 | A1 | * | 2/2003 | Billet et al. .................... 703/2 |

* cited by examiner

*Primary Examiner*—Joseph P. Hirl (57) ABSTRACT

The present invention pertains to a system for simulating business processes. The system has data warehouse for storing historical execution data from executions of a first business process. The system also has a business process simulator coupled to the data warehouse and for simulating a second business process using the historical execution data as input parameters and for outputting simulated business process data.

24 Claims, 9 Drawing Sheets

| | B4 | ▼ | ■ EOP Get Next Approver | |
|---|---|---|---|---|
| | | A | | B |
| 1 | NODE_NAME | | | SERVICE_NAME |
| 2 | Add Approver to System | | | EOP Add Approver |
| 3 | Check for Approver Existence | | | EOP Existence Check |
| 4 | Deliver Approval to Destination | | | EOP Get Next Approver |
| 5 | Get Next Approver | | | EOP Get Next Approver |
| 6 | Notify Approver of Work | | | EOP Notify Approver of Work |
| 7 | Notify NoAction | | | EOP Notify NoAction |
| 8 | Notify Requester Transaction Approved | | | EOP Notify Requester of Approval |
| 9 | Notify Requester Transaction Canceled | | | |
| 10 | Notify Requester Transaction Initiated | | | EOP Notify Requester of Initiation |
| 11 | Notify Requester Transaction Rejected | | | EOP Notify Requester of Reject |
| 12 | Notify Requester of Bad Form | | | |
| 13 | SubmitForApproval | | | EOP SubmitForApproval |
| 14 | | | | |
| 15 | | | | |
| 16 | | | | |

| AVG_DURATION | MAX_DURATION | MIN_DURATION | STDDEV_DURATION |
|---|---|---|---|
| 0.011263587 | 0.034386574 | 0.004675926 | 0.006784596 |
| 0.002104193 | 0.041539352 | 0.000185185 | 0.003381344 |
| 0.000727814 | 0.005891204 | 0.000335648 | 0.000681328 |
| 0.001440678 | 0.09212963 | 1.15741E-05 | 0.008982488 |
| 0.001688965 | 0.021678241 | 0.000104167 | 0.001876999 |
| 0.023748507 | 0.702673611 | 0.000277778 | 0.126005381 |
| 0.001215052 | 0.020706019 | 0.000138889 | 0.001893859 |
| 0.001678241 | 0.013402778 | 0.000219907 | 0.002985158 |
| 0.001545368 | 0.015960648 | 0.000162037 | 0.001941488 |
| 0.00100463 | 0.002118056 | 0.000150463 | 0.00092326 |
| 0.00162037 | 0.00162037 | 0.00162037 | 0 |
| 3.595980666 | 26.3300463 | 0.004259259 | 5.814424922 |

METHOD AND SYSTEM FOR SIMULATING A BUSINESS PROCESS USING HISTORICAL EXECUTION DATA

TECHNICAL FIELD

The present invention relates to the field of business processes. Specifically, the present invention relates to a method and system for simulating a business process based on historic execution data of a business process having common resources or services.

BACKGROUND ART

Business processes present business logic of enterprises and/or web services. Business processes are the business practices and procedures that all organizations implement to run their business. Many business processes are encapsulated into specific business applications. However, a business process is typically end-to-end and does not normally start and stop within one business application. For example, the process of ordering goods does not stop once the goods have been entered into an order processing system. An example of an end-to-end business process may include activities such as picking the goods in the warehouse, dispatching the goods to a courier, and recording that the goods have been delivered and that the customer is satisfied. In the dynamic Internet-based business environment, organizations may need to frequently redesign their business processes. However, such redesign is a very costly procedure and may result in an inefficient redesign.

Business Processes Management Systems (BPMS) are software applications that support the definition, execution, and management of business processes. BPMSs are being increasingly used both in traditional and in Internet-based enterprises to support administrative and production processes, execute e-commerce transactions, and monitor business operations. In fact, BPMSs typically allow companies to reduce costs and to improve the speed and quality of business process 100 executions. One of the main features of BPMS tools is the availability of a business process modeling facility, which enables business process designers to describe the many aspects involved in a business process execution, such as tasks, execution flows, data flows, resources, constraints, and exceptions. In addition, BPMSs also provide support for business process modification and versioning.

Figure 1:
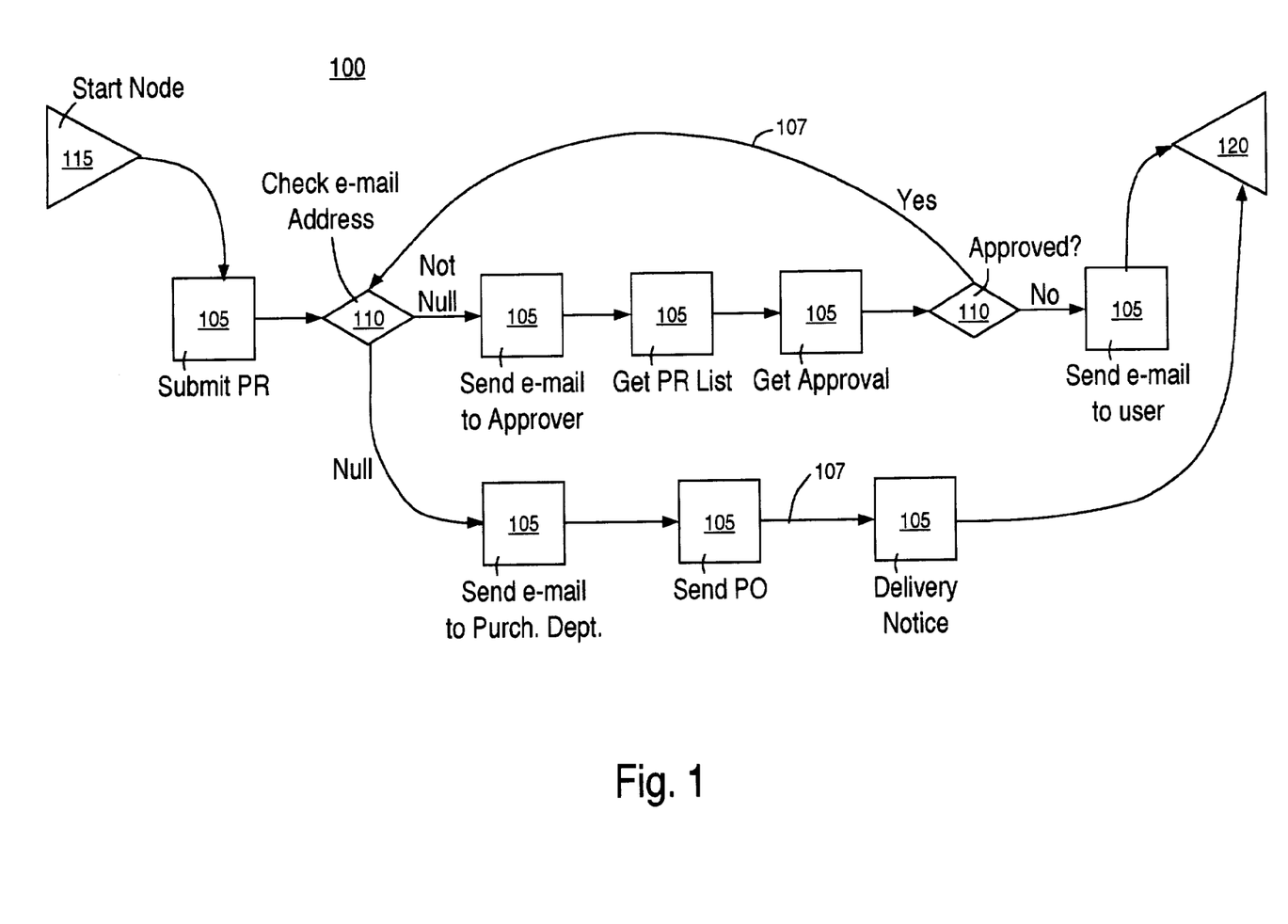
FIG. 1 is a conventional model for an exemplary business process.

A business process model of a Business Process Management System outlines business process definition elements and their relationships. FIG. 1 illustrates a model for an exemplary business process 100. The business process 100 is described by a directed graph that may have several different kinds of nodes. Work nodes 105 represent the invocation of activities (also called services) that may be assigned for execution to a human or automated resource. Route nodes 110 are decision points that route the execution flow among nodes based on an associated routing rule. Event nodes (not shown) may denote points in the business process 100 where an event is notified to or requested from other business processes 100. A start node 115 denotes the entry point to the business process 100. A complete node 120 denotes the termination point. Arcs 107 in the graph denote execution dependencies among nodes. When a work node 105 execution is completed, the output arc 107 is fired, and the node connected to that arc 107 is activated. Arcs 107 in output of route nodes 110 are fired based on the evaluation of the routing rules. Other models for business processes 100 than the one shown in FIG. 1 are possible.

FIG. 1 depicts an exemplary procurement business process 100. When a purchase request is issued through a web based front-end interface, an instance of this procurement business process 100 is created to handle this request. Every work node 105 is associated with a service (also called an activity) description, that defines the logic for selecting a resource (or resource group) to be invoked for executing the work. The service may also define the business process data items to be passed to the resource upon invocation and received from the resource upon completion of the work. Several work nodes 105 can be associated with the same service description.

While designing business processes 100 with such tools is feasible, designing good business processes 100 is extremely difficult for several reasons. First, business processes 100 are designed by a business process modeler who interviews individuals (e.g., business and information technology people) in an organization in order to discover and understand their actual or desired business processes 100. This is a difficult endeavor, and problems arise due to lack of complete information, lack of communication, lack of understanding, etc.

Secondly, designing good business processes 100 is difficult because business processes 100 have many different facets that need to be perfectly orchestrated in order to obtain optimal results. Third, it is difficult to predict the actual workload of the business process 100, and therefore it is difficult to define business process aspects (such as assignment to resources) that are affected by workload considerations. Fourth, although different business processes 100 are often designed independently and may be conceptually unrelated, they do interact in several ways. For example, they may share resources (e.g., human or automated), invoke the same services, and/or run on top of the same BPMS (thereby sharing the system resources). For these reasons, executions of a business process 100 may impact, and be impacted by, executions of other business processes 100.

One way to assist the development of new or modified business processes 100 is to simulate the execution of the new or modified business process 100. However, traditional business process simulation environments are fairly simple and simulate business processes 100 based on user-defined parameters, such as assumed transaction arrival rates, expected subtask execution time, and expected outcomes of branch condition evaluations. While this can be useful for an approximate analysis, it is insufficient to get a complete understanding of the potential impact caused by the new (or modified) business process 100.

In particular, existing approaches to business process simulation have several drawbacks. First, they do not take into account the load on resources and services (possibly caused by executions of different business processes 100). The performance of resources and services are likely to drop as the number of business process executions increase. Second, they do not take into account the load on the BPMS and the limited system capacity to execute business processes 100. Third, simulation parameters are provided by the user, often based on very rough estimates. While parameters describing average execution times are important, the behavior of the BPMS and of resources may deviate considerably from these average values. For example, some services may be very effective on weekdays, but very slow on weekends. These deviations need to be taken into account in order to avoid business processes 100 that have a reasonable average quality but that may still be affected by frequent quality degradations.

Thus, one problem with conventional methods and systems for designing business processes 100 is that they fail to provide the capability to redesign a business process 100 in a cost efficient fashion. Another problem with such conventional methods and systems is the failure to take into account the load on business process resources and services, as well load on the BPMS and its limited capacity to execute business processes 100 and services. Another problem with conventional methods and systems is the inaccuracy of simulation parameters, which are based on rough guesses.

DISCLOSURE OF THE INVENTION

The present invention pertains to a system for simulating business processes. The system has a data warehouse for storing historical execution data from executions of a first business process. The system also has a business process simulator coupled to the data warehouse and for simulating a second business process using the historical execution data as input parameters and for outputting simulated business process data.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method and system for simulating a business process using historical business process execution data as input parameters, numerous specific details are set forth in order to provide a thorough understanding of the present invention. However, the present invention may be practiced without these specific details or by using alternate elements or methods. In other instances well known methods, procedures, components, and circuits have not been described in detail as not to unnecessarily obscure aspects of the present invention.

Embodiments of the present invention provide a very useful simulation tool for business process designers, developers, and administrators by offering a way to understand the behavior of a newly-designed or a modified business process 100 without involving costly deployment procedures. Embodiments use historical data from executions of an existing business process 100 or processes 100 as input parameters to a simulated business process 100.

Embodiments of the present invention may sample execution data from an existing business process 100 and store the data in a database. Frequently, a new or modified business process 100 being developed will have common resources or services with one or more existing business processes 100. Embodiments of the present invention simulate the new or modified business process 100, using the execution data as input parameters. This allows the user to judge the efficiency of the simulated business process 100 before actual implementation and to refine the new or modified business process 100. Because historic execution data are used as input parameters, the simulation is more accurate than conventional simulation techniques.

Figure 2:
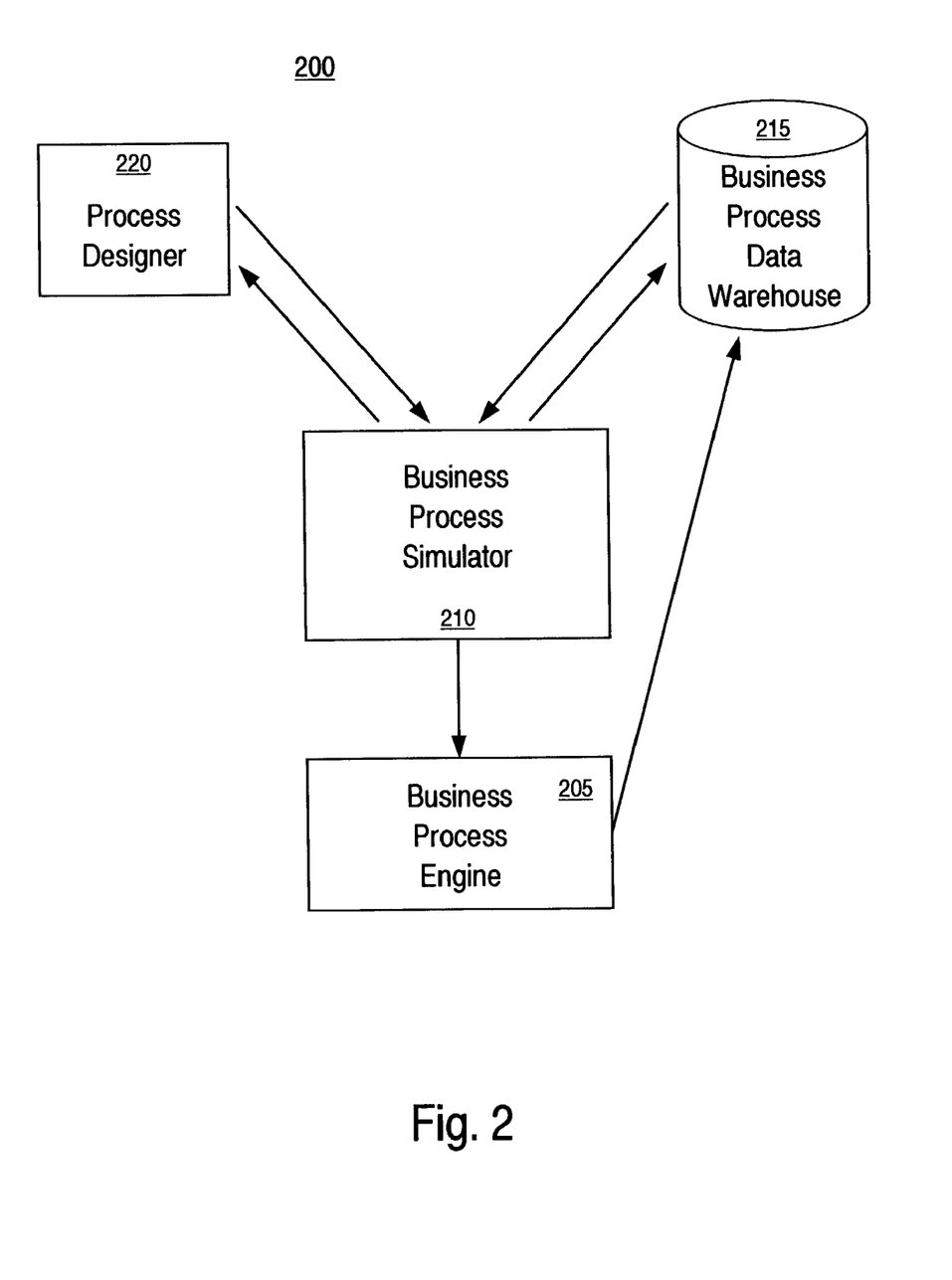
FIG. 2 is a block diagram illustrating a system for simulating a business process based on historical business process execution data, according to an embodiment of the present invention.

FIG. 2 shows a business process simulation architecture 200, in which a business process simulator 210 may reside. The business process engine 205 executes a business process 100, such as the exemplary business process 100 shown in FIG. 1. A suitable product for implementing the business process engine 205 may be the Hewlett-Packard Process Manager, provided by Hewlett-Packard of Palo Alto, Calif.

Still referring to FIG. 2, during execution of an existing business process 100 by the business process engine 205, various business process execution data are collected and stored in the business process data warehouse 215. The execution data may include, for example, the amount of time it takes a worker to process a work request. This simulation architecture 200 also integrates business process 100 and service/resource analysis and derives business process simulation parameters from past executions, by querying the business process data warehouse 215.

When the business process 100 to be simulated includes nodes (e.g., work nodes 105, route nodes 110, etc.), resources, or services that already exist and for which execution parameters are available, then these parameters may be derived from the business process data warehouse 215. This approach enables more accurate simulation than conventional methods in which parameters are inserted by the business process designer 220 based on guesses or estimates. The business process designer 220, may involve human input and may also use a business process design tool, creates a new or modified business process 100 that is simulated. Based on the simulation results, the design may be modified by and a new simulation run. In addition, embodiments of the present invention can load a very high number of parameters that describe both time-based and case-based characteristics (e.g., the performance of a resource in processing travel requests on weekends). After a user is satisfied with the simulated results, the business process 100 may be executed by the business process engine 205 as a real-world application.

Figure 3:
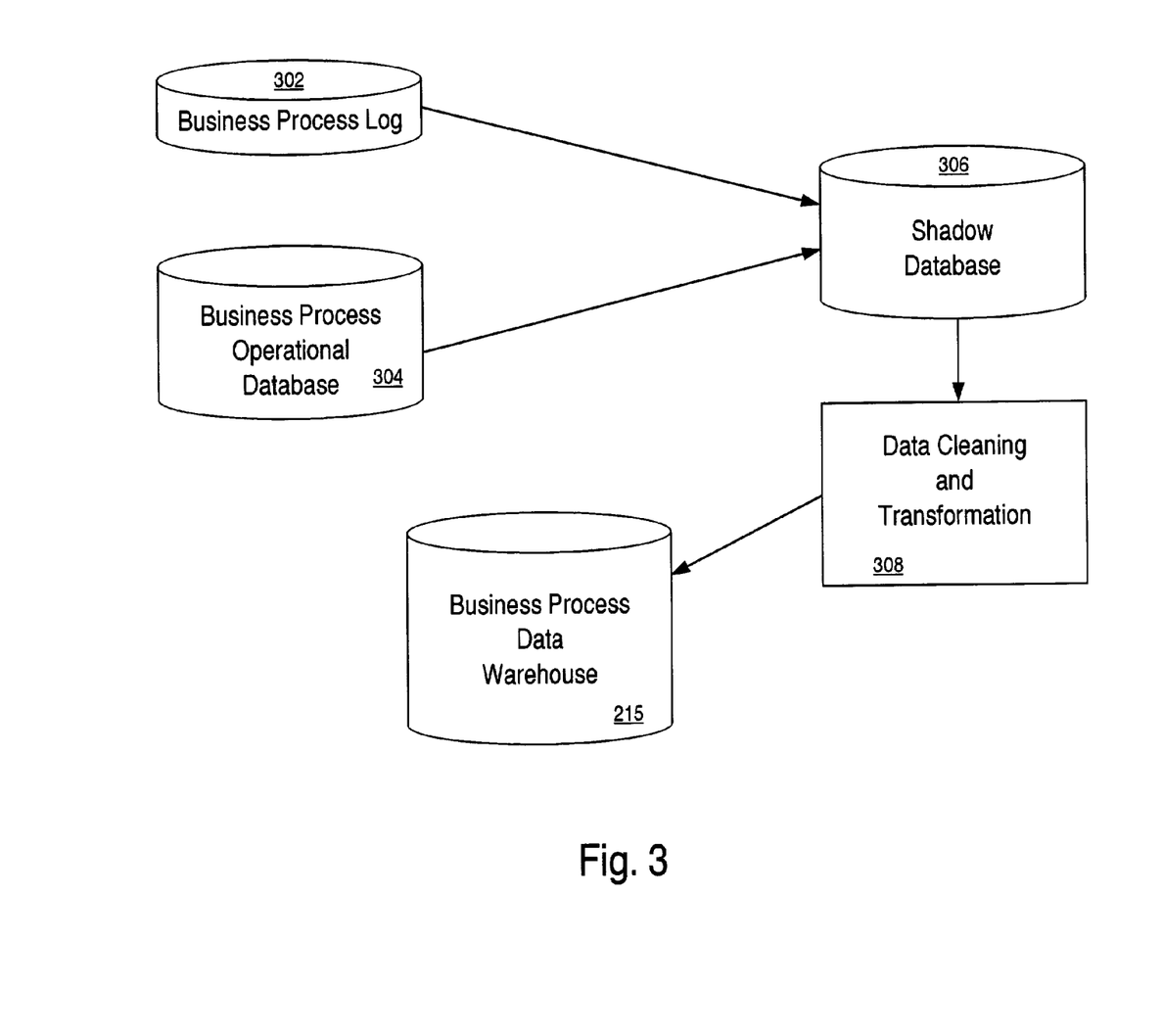
FIG. 3 is a diagram illustrating a procedure for loading historical business process execution data in a database, according to an embodiment of the present invention.

To produce the data in the business process data warehouse 215, an extraction/transfer/load process may be done, as seen in the embodiment of FIG. 3. However, the present invention is not limited to creating the data in the business process data warehouse 215 in this fashion. FIG. 3 shows a business process log 302 and a business process operational database 304, which contain data from executions of one or more business processes 100. This data may be collected by a workflow management system, such as, for example, the Hewlett-Packard Process Manager, provided by Hewlett-Packard of Palo Alto, Calif. However, this raw data may have limited usefulness for simulating the new business process 100. For example, while the data may include the number of process instances completed in a given time period and their average execution times, it may lack the organization to be as useful as possible for simulation input parameters. The workflow management system may be used to log many events that occur during business process 100 executions, including the start and completion time of each activity, its input and output data, and the resource that executed it. Details relating to a business process log 302, according to one embodiment, may be found in, for example, "The HP Changengine Technical Reference Guide, Edition 4.4, 2000".

Referring still to FIG. 3, to provide more useful business process simulation input parameters, the data from the business process log 302 and the business process operational database 304 are extracted and put into the shadow database or tables 306. From there, the data undergo a cleaning and transformation step 308 and are then transferred to the business process data warehouse 215. The data are organized in the business process data warehouse 215 in a logical fashion such that they provide very useful input parameters to the business process simulation.

This process of extracting the data from the business process log 302 and the business process operational database 304 may be performed by a set of scripts, in one embodiment. These data may be available in the form of log files. The first step may consist in extracting data from the files and restoring the content in a relational format. Then, a sequence of cleaning operations can be applied. This may be performed without changing the structure of the data. The advantage of this approach is that cleaning modules can be plugged in and out depending on the cleaning needs of the users. The addition of each cleaning module may cause delays in the load process, but can guarantee data consistency, absence of duplicates, and other properties that facilitate integrity.

Data are then inserted into the shadow database or table 306, which may have the same schema as the business process data warehouse 215. Preparing a shadow table 306 instead of directly loading the business process data warehouse 215 provides several advantages. First, once data are in the shadow table 306, then the business process data warehouse 215 can be quickly loaded by means of simple inserts or partition exchanges, reducing the business process warehouse 215 downtime. Second, the schema of the shadow tables 306 are independent of the workflow management system and can be used to execute cleaning operations independent of the workflow management system. To load the data into the business process data warehouse 215 the data are cleaned to ensure consistency of the data and the data are transformed into the business process warehouse 215 format. At this time, various semantic information may also be deduced from the data in the shadow table 306.

The business process warehouse 215 may follow traditional data warehousing techniques. Referring now to the embodiment shown in FIG. 4, the business process data warehouse 215 may be designed according to a relational star schema. In this star schema, data may be described in facts (in fact tables 402), which may be analyzed for a number of dimensions 404 (e.g., perspectives under which the data in the fact tables 402 are analyzed). In a business process 100, happenings of interest include changes in the business process 100 and node execution states. The data in the fact tables 402 may include these state changes. Examples of data in the fact tables 402 may be business process 100 instance executions and service executions. Fact table 402 data may include such attributes as start and completion times, durations, input process data, and output process data.

Figure 4:
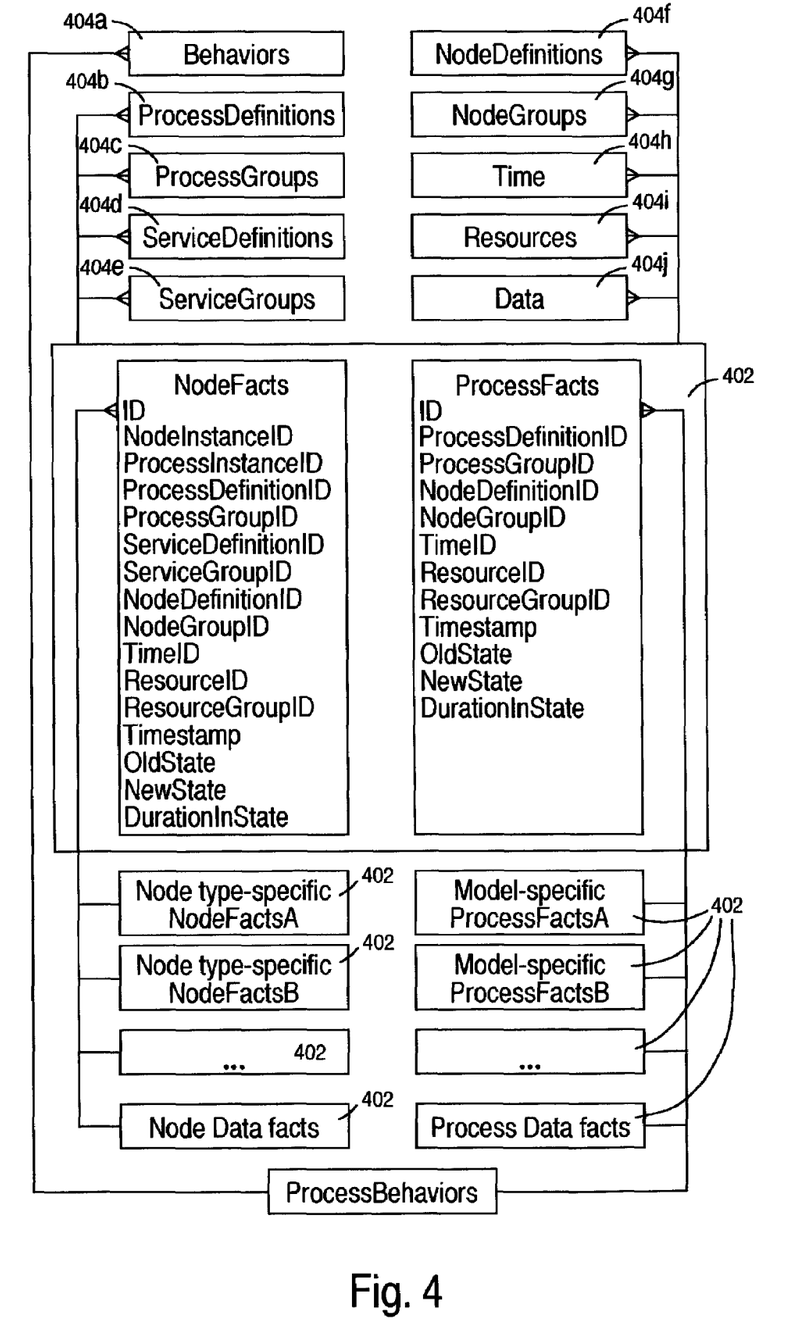
FIG. 4 is a diagram of schema for storing historical business process execution data, according to an embodiment of the present invention.

The following are examples of dimensions 404 in which fact tables 402 may be analyzed. A behavior dimension 404$a$ focuses on instances that exhibited a user-defined behavior of interest. A process definition dimension 404$b$ relates to facts for a specific process definition (and possibly a specific version) or a set of process definitions. A process groups dimension 404$c$ relates to facts for processes within a group. A service definition dimension 404$d$ relates to facts for a specific service definition or to a set of service definitions. A service groups dimension 404$e$ relates to facts for services within a group or services. A node definition dimension 404$f$ relates to facts for a specific node definition or to a set of node definitions. A node group dimension 404$g$ relates to facts for a group of nodes. A time dimension 404$h$ relates to facts that occurred in a certain time window (e.g., fiscal, calendar, etc), on specific dates, on certain days of the week, or certain hours of the day. A resource dimension 404$i$ relates to business process data items. A data item dimension 404$j$ focuses on specific business process data items.

Dimensions 404 as well as relationships between facts and dimensions 404 can be computed from the shadow tables 306. For example, shadow tables 306 can be used to collect timestamps of facts, and load a time dimension table 404$h$ to extract load statistics.

A design based on a star schema enables multidimensional analysis and allows the use of many query optimization techniques. The structure and relationships of fact tables 402 and dimensions 404 may be tailored, based on customer need, in order to optimize performance for many typical simulation needs.

In one embodiment, the business process warehouse 215 may add data to fact tables 402 about completed business process 100 instances, to simplify data archival and loading and to provide a simple framework in which to analyze data. However, the business process warehouse 215 may include data for active business processes 100, in another embodiment.

The definition of the structure and relationship among facts may be complicated by the variety of node types present in most workflow models. For instance, the business process 100 in FIG. 1 includes a work node 105 and a route node 110 to model service invocation and routing decisions, respectively. These nodes have different attributes that are described in the business process warehouse 215 schema. For example, a work node 105 execution may be related to the service invoked or to the resource that executed the service, while a route node 110 execution may be characterized by the set of arcs 107 fired. However, the present invention is not limited to the workflow models shown in FIG. 1. Consequently, the fact tables 402 in business process warehouse 215 may be designed to represent other process and node facts, while still enabling easy maintenance and satisfactory performance.

Thus, the fact tables 402 may be generically designed (e.g., node type and model-independent) and may include not only attributes common to most models or node types, but also attributes often useful for typical simulations (although they may have null values for some workflow models or node types). In this way, the historic execution data may be aggregated and used as input parameters to simulation, based on the fact tables 402.

However, facts tables 402 that are specific to a node type or to a process model can also be added to the business process warehouse 215, to allow storing attributes that are not included in the generic fact tables 402 but that can be useful for specific simulations.

Figure 5:
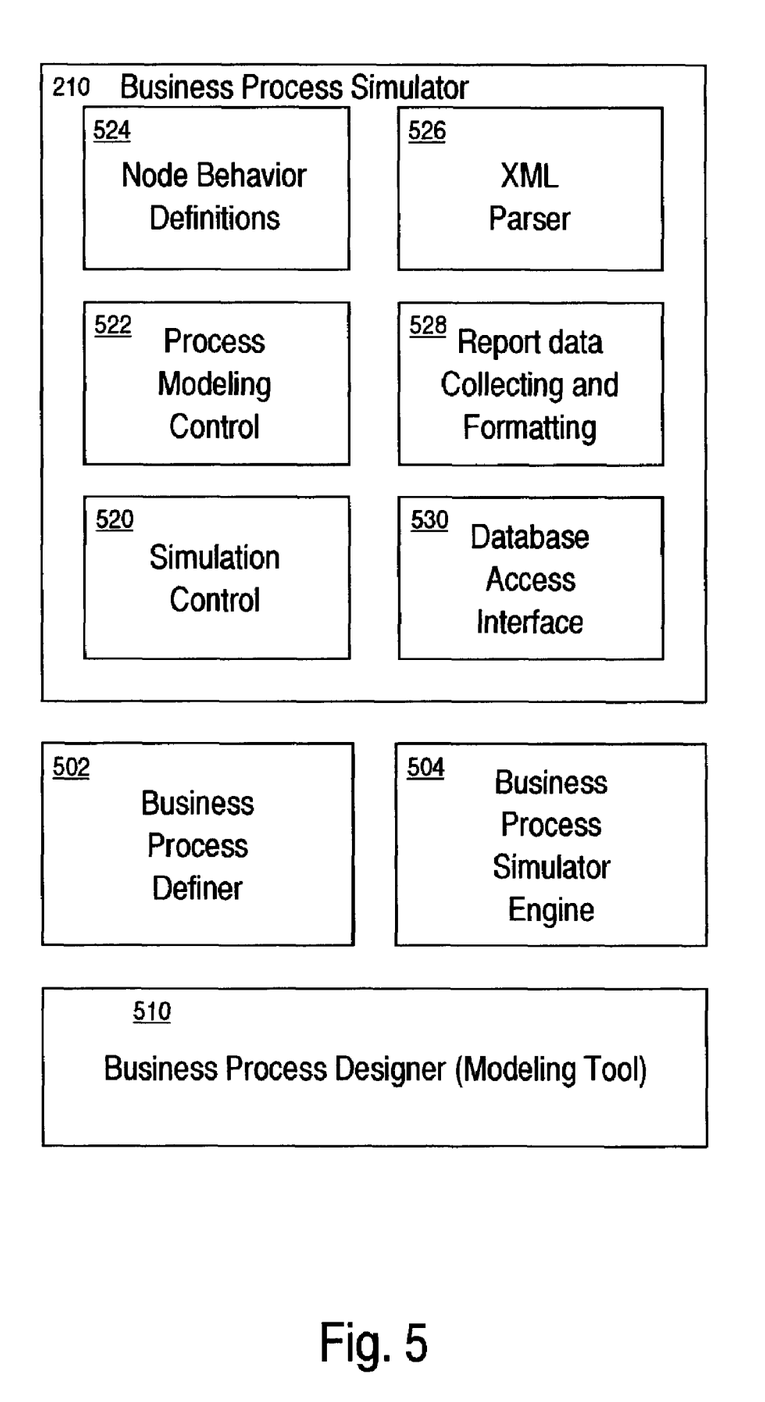
FIG. 5 is a diagram of a business process simulator and associated components, according to an embodiment of the present invention.

FIG. 5 illustrates a diagram of a business process simulator 210 and its relationship to other components, according to an embodiment of the present invention. The business process simulator 210 may reside on top of a business process definer 502 and a business process simulator engine 504. The business process definer 502 may be implemented by, for example, the Hewlett-Packard Process Manager, provided by Hewlett-Packard of Palo Alto, Calif. The business process simulator engine 504 may be implemented with, for example, the iGrafx™ Business Process 2000 supplied by Micrografx® of Dallas, Tex. At the base of the diagram in FIG. 5 is a business process designer 510, which allows a user to create a graphical representation of a business process 100, such as the representation in FIG. 1. Suitable products for implementing the business process designer 510 are known to those of ordinary skill in the art.

The business process simulator 210 has simulation control 520 for allowing a user to set-up parameters and to run the simulation, such as, start, pause. The business process modeling control 522 facilitates the set-up of the business process 100 model to be simulated. This may be accessed by a user or program. The node behavior definition 524 may be for defining how a node behaves in the simulated environment. The data comes from business process definer assumption and from the historic execution data (e.g., the business process data warehouse 215).

Still referring to FIG. 5, the business process simulator 210 has an XML parser 526 for scenario data input and output, which may be used to parse an XML structure which defines the business process 100 to be simulated. The business process simulator 210 also has report data collecting and formatting logic 528. The database access interface 530 is for accessing the historic execution data from the business process data warehouse 215.

The business process simulator 210 provides various ways to generate workload for business process simulation. First, a business process instance can be generated only after the previous one has completed. Through this type of workload, business process developers can estimate average cycle of the business process 100 at which they are working. Second, a business process instance can be generated whenever the start node 115 has an available resource. This type of workload can help a business process developer find out capacity of his or her business process 100 under a certain resource configuration. Third, business process instances can be generated in an inter-arrival way. The inter-arrival time can be set as a constant or it can be set to follow an expression. Business process instances can be generated at the occurrence of a specific time event such as 8:30 am every workday or 10:00 am every Tuesday. Business process instances can also be generated based on a timetable that specifies the numbers of business process instances to be issued in each specified time period. A timetable can be generated from business process execution log information. Then the business process simulator 210 can repeat the activation pattern that occurred in a past time period.

The business process simulator 210 allows for resource arrangement, in one embodiment. For example, the number of resources (e.g. number of workers) that go to receiving a purchase order request may be changed from one simulation to the next to determine the effect of that change. Alternatively, the cost of the resource may be changed.

The business process simulator 210 allows a business process developer to define a schedule (e.g., resource schedule or activity schedule) for simulation execution in a flexible way, in one embodiment. A schedule may be a list of active hours and days. When creating a simulation scenario, a business process developer can set the simulation to begin Monday morning at 8:00 am (which is the default) or he can designate the exact days and hours during which the simulation takes place. A resource schedule determines the times that the resource is available. It is set at the resource definition stage. For instance, a manager is available from 9:00 am to 5:00 p.m. Monday through Friday. A security guard is available from 6:00 p.m. to 6:00 am every weekday night. An activity schedule determines the times that the work node that represent this activity can be fired. For example, a staff meeting is set on 10:00 am on each Tuesday. During this meeting time, all workforces are subject to hold their current tasks and attend the meeting.

The business process simulator 210 inputs various parameters. The two major activity (service) parameters are duration and cost. However, the present invention is not limited to these parameters. The duration can be a constant, or it can be defined by an expression. Durations for work nodes 105 in a business process 100 may be automatically derived from information stored in the business process data warehouse 215. The business process data warehouse 215 may include duration information for each execution for each work node 105 (e.g., how long it took a worker to process a, request). Therefore, if the business process 100 to be simulated includes a work node 105 that has executed in the past, its characteristics can be derived from the business process data warehouse 215. The business process data warehouse 215 may also store cost parameters, such as an hourly cost associated with a work node 105.

Figure 6:
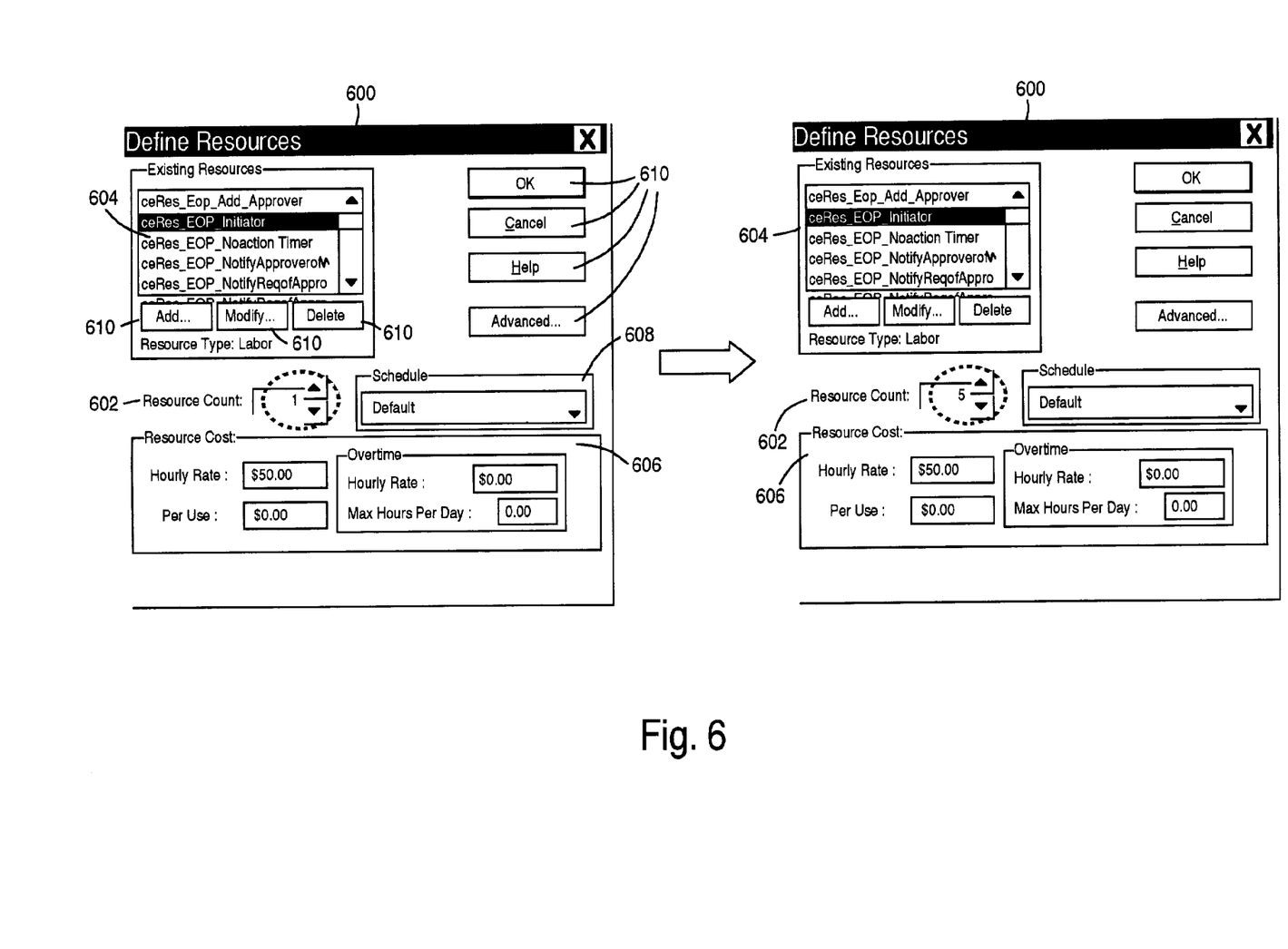
FIG. 6 is a diagram illustrating an interface for selecting simulation parameters, according to an embodiment of the present invention.

These parameters may also be entered manually by a user. FIG. 6 illustrates an exemplary user interface 600 for defining resources. In FIG. 6, the resource count 602 is "1" on the left hand graphical user interface (GUI) and is changed to "5" on the right hand GUI, which may correspond to increasing the number of workers who perform a particular function in the business process 100 from one to five. In this fashion, a new simulation may be run to determine the effect of this change. Analogous techniques are used for determining resource data. Thus, embodiments of the present invention allow for some input parameters to be user selected, while using the business process data warehouse 215 for other input parameters. The exemplary user interface 600 also has an existing resource window 604. The resource cost area 606 is used for setting resource costs. The schedule area 608 may be used for setting when the simulation instantiates a new execution. Various buttons 610 are available for initiating program actions.

The business process simulator 210 may determine input parameters to the simulated business process 100 by extracting data from the business process data warehouse 215 and computing a distribution. For example, it processes the duration data about the executions of a node to compute what is the probability distribution of that node's duration. The distribution parameters (e.g., normal distribution with a certain average and variance) are inserted as simulation parameters for that node.

Figure 7:
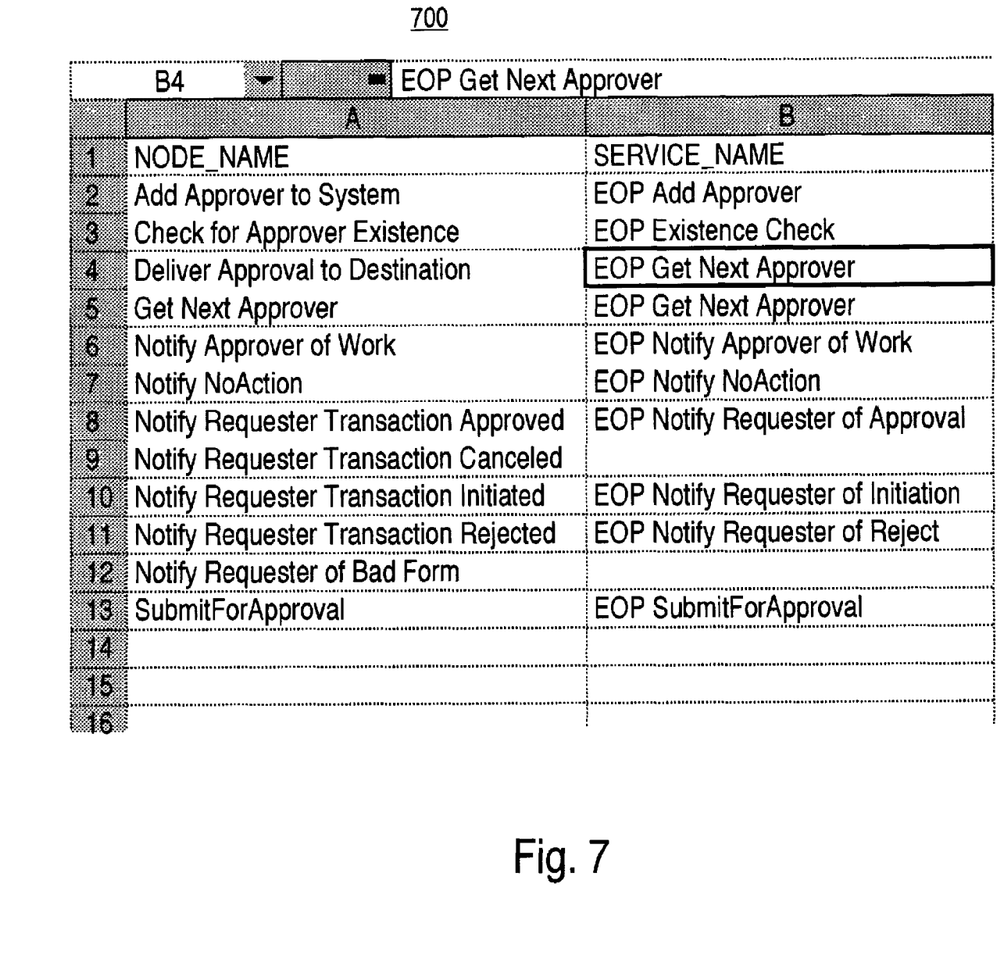
FIG. 7 is a diagram illustrating exemplary data input to a business process simulator, according to an embodiment of the present invention.

Alternatively, the data in the business process data warehouse 215 may already be statistically analyzed. FIG. 7 shows exemplary historic execution data 700 from the business process data warehouse 215 that is input to the business process simulator 210. Column A of the exemplary historic execution data 700 describe various nodes in a business process 100. There is a row of data for each of the nodes. Column B describes the service name that is associated with the node. Work nodes 105 may be associated with a service (also called activity) description, that defines the logic for selecting a resource (or resource group) to be invoked for executing the work. The service also defines the business process data items to be passed to the resource upon invocation and received from the resource upon completion of the work. Several work nodes 105 can be associated with the same service description.

Still referring to FIG. 7, columns C–F provide statistical measures of the duration (e.g., in days) that it took the node to complete its task. In particular, Column C provides average duration, column D provides the maximum duration, column E provides the minimum duration, and column F provides the standard deviation of the duration. Other measures may be provided by the business process data warehouse 215 as well.

The business process simulator 210 may also inform the user if the confidence of the derived distribution is below a certain, specified threshold.

For route nodes 110, parameters may be ratios (e.g., probabilities) for each outlet (e.g., output arc 107). The business process simulator 210 may input these parameters from the business process data warehouse 215. For example, if a route node 110 is analogous to a route node 110 for which historic execution data exist, that data may be used as input parameters to the simulated business process 100. Alternatively, these input parameters may be manually input, for example via a GUI (e.g., the GUI in FIG. 6). Thus, business process developers can analyze several different execution cases by altering these behavior parameters in several different manners, in addition to pulling in historic execution data from the business process data warehouse 215.

The simulation results may be collected and reported. The results may cover the dynamic aspects of a business process 100 and may include process times, costs, resource utilizations, and work queues. Business process developers can use custom statistics to create customized combinations of the standard statistics (e.g., setting cost information or revenue formulas). Several sets of named simulation data can be compared to evaluate different scenarios.

EXEMPLARY CASE STUDY

The exemplary business process 100 of FIG. 1 may be used to illustrate how the business process simulator 210 according to embodiments of the present invention operates. The exemplary business process 100 contains a start node 115, eight work nodes 105, two route nodes 110 and one complete node 120. The duration of the start node 115 is set to five minutes, work node "submit PR" to 10 minutes, work node "Get Approval" to 10 minutes. All other e-mail and notification type work nodes have one-minute durations. The outlet ratio for both route nodes 110 are 50 percent. The workload-generator produces a total of 1000 transactions for each simulation run. Those transactions are arriving in a uniform distribution with random spread in a range between one to thirty minutes. The elapsed time for one thousand transactions is 44.21 days. The resource utilization of the first simulation is shown in the second column of Table 1. The third column shows the resource utilization for a second simulation in which the approval ratio is changed from 50/50 to 70/30 in favor of disapproval, with the same elapsed time for one thousand transactions.

TABLE 1

| Node | First Simulation Resource Utilization % | Second Simulation Resource Utilization % |
| --- | --- | --- |
| Start_Node | 32.05 | 32.05 |
| Submit_PR | 64.10 | 64.07 |
| Send_Email_To_Approver | 4.28 | 3.77 |
| Send_Email_To_Purch_Dept | 4.27 | 3.77 |
| Send_PO | 4.27 | 3.77 |
| Get_Approval | 42.75 | 37.74 |
| Delivery_Notice | 4.27 | 3.77 |
| Send_Email_To_User | 2.14 | 2.64 |
| Get_PR_List | 21.38 | 18.77 |

Another example of an input parameter change is to reduce the time cost of the resource $Get_{13}$ Approval (which is usually a role that is performed by a manager. Simulation results show that the average cycle for the first and second simulation are 2.09 hours and 2.13 hours respectively. If the cost of the resource $Get_{13}$ Approval is cut in half, the average business process cycle drops to 1.89 hours. Furthermore, resource utilization of $Get_{13}$ Approval drops to 18.88 from 37.74.

The business process simulator 210 may also report total cost and cost distribution in a business process 100, queue size of each resource, activity statistics, etc.

An embodiment of the present invention provides for a method of simulating a business process 100, based on historical business process data. Steps of process 800 of FIG. 8 may be stored on a computer readable medium and executed as instructions on a general-purpose microprocessor. In step 810, data is collected by monitoring the execution of an existing business process 100. For example, the business process 100 of FIG. 1 is monitored and data such as execution time for completing a task is collected.

Figure 8:
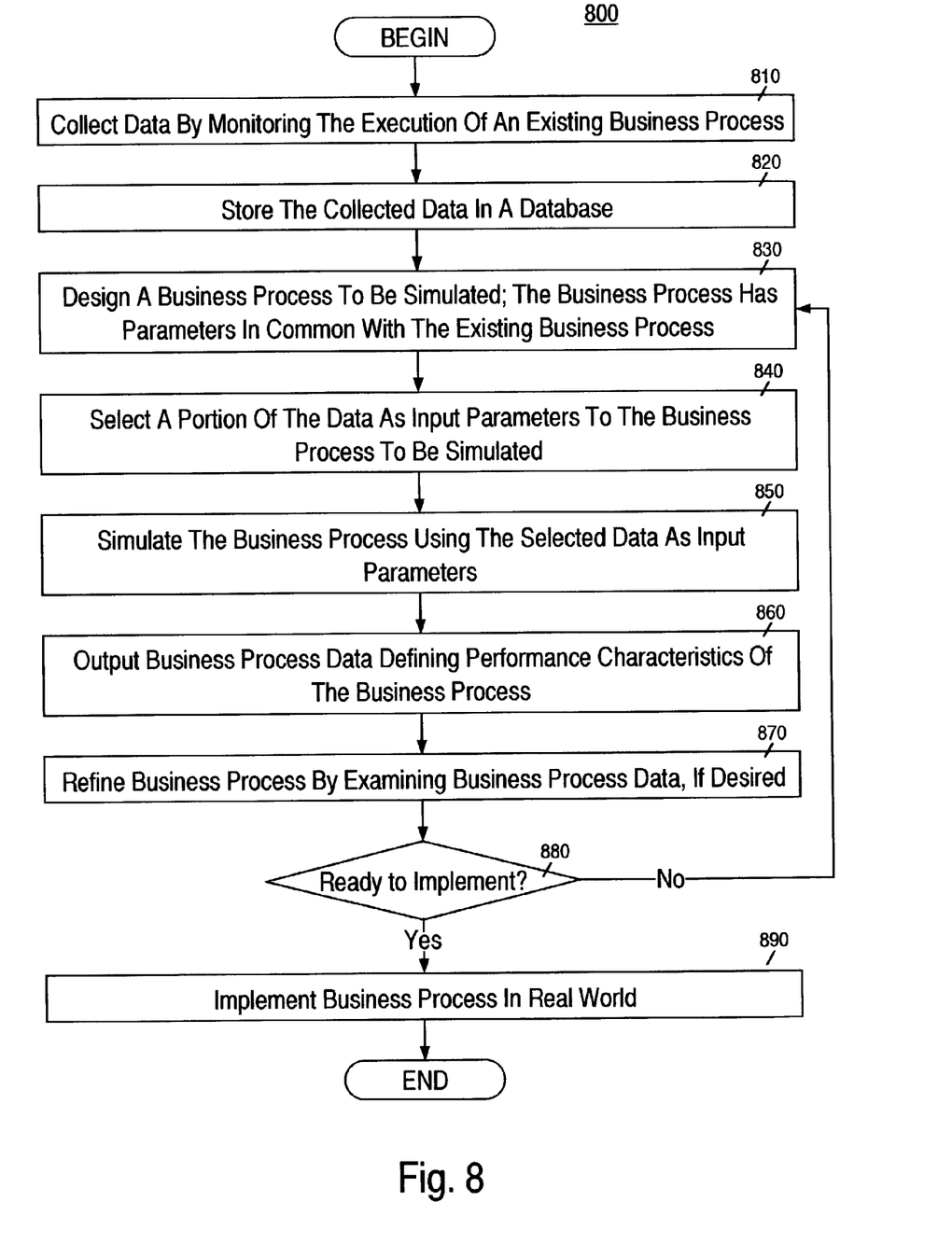
FIG. 8 is flowchart illustrating steps of a process of simulating a business process based on historical business process execution data.

In step 820, the data is stored in the business process data warehouse 215. The data are organized into a schema that provides highly useful as input parameters to the simulated business process 100. For example, the schema may be organized into facts and dimensions as discussed herein.

In step 830, a business process 100 to be simulated is designed. The business process 100 may be a modification to the existing business process 100 or a new business process 100. For example, a user designs the business process 100 using a commonly available commercial tool. The business process 100 to be simulated 100 and the existing business process 100 have a common node, activity (e.g., service), and/or resource, such that input parameters are available for the simulated business process, based on the execution of the existing business process 100. For example, a work node 105 such as submit PR may be common to both business processes 100, in which case the simulated business process 100 may use historic execution data as input parameters.

In step 840, a portion of the data is selected as input parameters to the business process 100 to be simulated. Not all of the data in the business process data warehouse 215 will be relevant to the business process 100 being simulated. Embodiments of the present invention select suitable data to be used as input parameters such that the simulation reflects real-world conditions, resources, services, etc. Suitable techniques for selecting appropriate data are known by those of ordinary skill in the art.

In step 850, the business process 100 is simulated using the selected data as input parameters. The business process 100 may be simulated on a business process simulation engine 504. For example, a discrete event simulation engine such as iGrafx™ Business Process 2000 supplied by Micrografx® of Dallas, Tex. may be used as a platform for implementing the business process simulation engine 504. The simulation environment changes from one state to another at discrete points in time as the result of simulation events. Simulation events could be a resource starting its work, a resource finishing its work, or a pre-scheduled work being due.

In step 860, business process data are output defining performance characteristics of the simulated business process 100. The user may use these to judge the performance and efficiency of the simulated business process 100 and to refine the simulated business process 100 in step 870, if desired.

If the user wishes to perform another simulation with a redefined business process 100, then process 800 branches from step 880 to repeat steps 840–860.

When the user is satisfied with the design of the simulated business process 100, it may be executed in the real world by moving on to step 890. For example, the new or modified business process 100 is executed on the business process engine 205.

While the present invention has been described in particular embodiments, it should be appreciated that the present invention should not be construed as limited by such embodiments, but rather construed according to the below claims.

We claim:

1. A system for simulating a business process, comprising:
   a data warehouse for storing historical execution data from a plurality of executions of a first business process; and
   a business process simulator coupled to said data warehouse and for simulating a second (new/modified) business process using said historical execution data as input parameters and for outputting simulated business process data.

2. The system of claim 1, wherein said business process simulator comprises an interface for receiving historical execution data of said first business process and a business process simulation engine for simulating execution of said second business process using said historical execution data as input parameters, wherein said first business process and said second business process have at least one node in common.

3. The system of claim 1, wherein said historical execution is organized data in said data warehouse in a schema comprising facts and dimensions, wherein said facts are stored in a plurality of fact tables and wherein said dimensions provide different perspectives for said facts.

4. The system of claim 1, wherein said data warehouse stores execution data from a plurality of business processes.

5. The system of claim 1, further comprising a business process engine for executing said first business process and for producing said historical execution data.

6. The system of claim 1, wherein said business process simulator is further for executing context dependent simulations.

7. The system of claim 6, wherein said business process simulator is further for selecting said historical execution data from said data warehouse that pertains to said context dependent simulations.

8. The system of claim 1, wherein said business process simulator is further for automatically identifying which of said historical execution data are to be used as said input parameters to said second business process.

9. The system of claim 1, wherein said second business process is a modification of said first business process.

10. The system of claim 1, wherein said first business process and said second business process share common resources, wherein at least a portion of said historical execution data relate to said common resources.

11. The system of claim 1, wherein said first business process and said second business process share common services, wherein at least a portion of said historical execution data relate to said common services.

12. The system of claim 1, wherein said first business process and said second business process execute on a common business process management system.

13. A method for simulating a business process, comprising:
   a) receiving a design for a new business process to be simulated, said new business process having activities or resources in common with an existing business process for which historic data are stored in a database;
   b) selecting a portion of said historic data as input parameters to said new business process and inputting said historic data from said database;
   c) simulating said new business process using said selected historic data as input parameters; and
   d) outputting business process data defining performance characteristics of said new business process.

14. The method of claim 13, further comprising:
   collecting said historic data by monitoring the execution of said existing business process; and
   storing said historic data in said database, wherein said historic data are available as said input parameters to said new business process.

15. The method of claim 13, wherein said b) comprises selecting said historic data that pertain to a selected context.

16. The method of claim 15, wherein said historic data pertain to the execution of said existing business process during a specified time period.

17. The method of claim 13, wherein said c) comprises instantiating said new business process according to a predetermined pattern.

18. The method of claim 13, wherein said c) comprises repeatedly initiating a new simulation of said new business process after a previous simulation of said new business process has completed, wherein average cycle time of said new business process is computed.

19. The method of claim 13, wherein said c) comprises repeatedly initiating a new simulation of said new business process when a node of said new business process has a resource available to it, wherein capacity of said new business process is computed under a selected resource constraint.

20. The method of claim 13, wherein said c) comprises repeatedly initiating a new simulation of said new business process at a pre-determined time, when a node of said new business process has a resource available to it, wherein capacity of said new business process is computed under a selected resource constraint.

21. The method of claim 13, further comprising:
   receiving a user-supplied input parameter; and
   simulating said new business process using said selected historic data and said user-supplied input parameter as input parameters.

22. A computer readable medium having stored therein instructions which, when executed on a general purpose processor, execute a method of simulating business processes, said method comprising:
   a) collecting execution data by monitoring the execution of a first business process;
   b) storing said execution data in a database;
   c) selecting a portion of said execution data as input parameters to a second (new/modified) business process that is to be simulated, wherein said first business process and said second business process have at least one node with a common service or resource;
   d) inputting said selected execution data from said database to a business process simulator;
   e) simulating said second business process using said selected execution data as input parameters; and
   f) outputting business process data defining performance characteristics of said second business process.

23. The computer readable medium of claim 22, wherein said a) of said method further comprises collecting said execution data by monitoring the execution of a plurality of business processes.

24. The computer readable medium of claim 22, wherein said b) of said method comprises storing said execution data in a schema comprising a plurality of dimensions of facts about said execution of said first business process, wherein said dimensions describe different perspectives in which said facts are described.

* * * * *

UNITED STATES PATENT AND TRADEMARK OFFICE
CERTIFICATE OF CORRECTION

PATENT NO. : 7,076,474 B2  Page 1 of 1
APPLICATION NO. : 10/174733
DATED : July 11, 2006
INVENTOR(S) : Li-Jie Jin et al.

It is certified that error appears in the above-identified patent and that said Letters Patent is hereby corrected as shown below:

In column 10, line 20, delete "$Get_{13}$ Approval" and insert -- Get_Approval --, therefor.

In column 10, line 24, delete "$Get_{13}$ Approval" and insert -- Get_Approval --, therefor.

In column 10, line 26, delete "$Get_{13}$ Approval" and insert -- Get_Approval --, therefor.

Signed and Sealed this

Twenty-eighth Day of April, 2009

JOHN DOLL
*Acting Director of the United States Patent and Trademark Office*